24-90 R AU 351 EX
OR RE 3,421 BEST AVAILABLE COPY

Exam.

Div. 11.

D. M. Somers & W. S. Atwood.

Button.

Re 3421.

Reissued May 4. 1869.

Fig. 1.

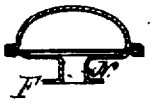

Fig. 2.

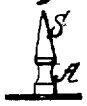

Fig. 5.

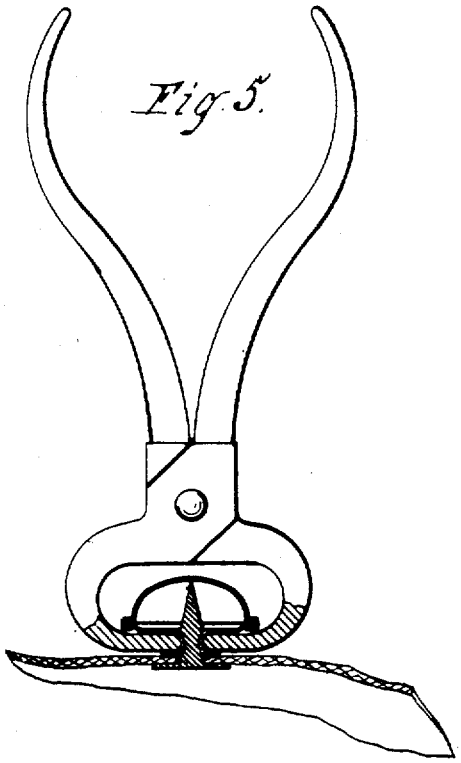

Fig. 3.

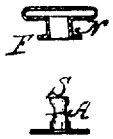

3,421.—W. H. Nash, New York, N. Y., Chairman of Committee on Organization, assignee of D. M. Somers and Walter S. Atwood.—Button.—Patented December 31, 1867; No. 79,988; reissued May 4, 1869.

Claim.—The combination, with the button or its shank or neck, of a [illegible] central stem or rivet, when said neck [illegible] are so constructed as that the one part [illegible] fit within or enter the other, and [illegible] together by compression applied [illegible] outside of them, in rear of the [illegible] the latter and the material to which [illegible] is attached, substantially as specified.

Fig. 4.

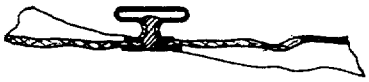

Witnesses.

S. A. Crockett

Charles A. Harrison

Inventors.

D. M. Somers.

W. S. Atwood.

United States Patent Office.

W. H. REED, OF NEW YORK, N. Y., CHAIRMAN OF COMMITTEE ON ORGANIZATION ASSIGNEE OF D. M. SOMERS AND WALTER S. ATWOOD.

*Letters Patent No.* 79,929, *dated December* 31, 1867; *reissue No.* 3,421, *dated May* 4, 1869.

IMPROVEMENT IN BUTTONS.

The Schedule referred to in these Letters Patent and making part of the same.

*To all whom it may concern:*

Be it known that the following is a full, clear, and exact description of an Improvement in Buttons, or improved mode of fastening buttons to materials of various kinds, invented by D. M. SOMERS, of the city of Brooklyn, in the county of Kings, and State of New York, and WALTER S. ATWOOD, formerly of the city of Newark, in the county of Essex, and State of New Jersey, but now of Brooklyn aforesaid, of which the following is a full, clear, and exact description, reference being had to the accompanying drawing, forming part of this specification, and in which—

Figure 1 represents a transverse section of military button; and

Figure 2, a view of an independent central stem or rivet, for use in connection therewith.

Figure 3 represents similar views of a different style of button, and independent central stem or rivet to suit; and Figure 4, a sectional view of said button and rivet, as united by compression, and holding a piece of cloth or material in between them.

Figure 5 is a similar view to fig. 4, in illustration of how the compression may be produced, to effect the fastening of the button to the cloth or other material, in accordance with this invention.

The invention consists in combining with the neck or shank of the button, an independent central stem or rivet, when said neck and stem are so constructed as that the one may be made to enter the other, and the two be secured together by compression applied laterally, or to the outside of them, in rear of the button, for the purpose of fastening the latter to the material.

To enable others skilled in the art to make and use the invention, the construction and mode of attaching buttons, according to the modification shown in the drawing, will now be proceeded with.

A button, as shown in fig. 1 of the accompanying drawing, is constructed of any suitable material, style, and kind, with a back that has its centre extended into a hollow cylindrical neck or shank, marked N, the lower end of which is expanded into a flange marked F.

There is also constructed, a second piece or central stem, with a disk at one end, as shown in fig. 2, or as at S in fig. 3.

The portion of the stem which lies within the neck N is reduced in diameter, as shown at A in fig. 2, or may be reduced from opposite sides, as shown at A in fig. 3.

This stem may be pointed, to pierce the cloth when the button is of such hollow character as to receive a pointed extension of said stem.

To attach this button to the cloth or other material, the central stem or rivet, as it may be termed, is passed through the material, into the neck of the button, and, by means of a suitable instrument, which may be constructed as shown in fig. 5, the neck is compressed to fit the reduced portion of the stem, as shown in figs. 4 and 5, thus attaching the button to the stem and firmly clasping the cloth.

Among the advantages claimed for this mode of fastening are, its adaptability to buttons in use, the great rapidity with which the button may be attached, and its permanent and erect position upon the goods when attached.

What is here claimed, and desired to be secured by Letters Patent, is—

The combination, with the button or its shank or neck, of an independent central stem or rivet, when said neck and stem are so constructed as that the one may be made to fit within or enter the other, and the two be secured together by compression applied laterally, or to the outside of them, in rear of the button, between the latter and the material to which the button is attached, substantially as specified.

W. H. REED.

Witnesses:

D. M. SOMERS,

W. S. ATWOOD.